United States Patent

Jonas et al.

[11] 3,853,878
[45] Dec. 10, 1974

[54] 1,2,3,4,10,10A-HEXAHYDROPYRAZINO[1,2:A]INDOLE-2-CARBOXAMIDINES

[75] Inventors: Rochus Jonas; Richard Unger; Hans-Jochen Schliep; Ernst Schorscher, all of Darmstadt, Germany

[73] Assignee: Merck Patent Gesellscheft mit beschrankter Haftung, Darmstadt, Germany

[22] Filed: Dec. 14, 1972

[21] Appl. No.: 314,934

[30] Foreign Application Priority Data
Dec. 16, 1971 Germany............................ 2162422
Oct. 14, 1972 Germany............................ 2250493

[52] U.S. Cl.......260/268 TR, 424/250, 260/326.11, 260/250 R
[51] Int. Cl..................................... C07d 51/70
[58] Field of Search............................. 260/268 TR

[56] References Cited
OTHER PUBLICATIONS
Shvedov, V. I. et al., Chemical Abstracts, Vol. 74, (1971).
Garner, G. B. et al., Chemical Abstracts, Vol. 76, (1972).

*Primary Examiner*—Donald G. Daus
*Assistant Examiner*—Jose Tovar
*Attorney, Agent, or Firm*—Millen, Raptes & White

[57] ABSTRACT

Compounds of the formula

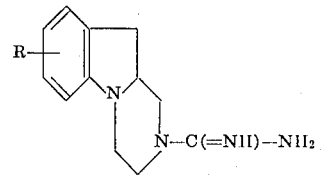

wherein R is H or $CH_3O$, and the physiologically acceptable acid addition salts thereof exhibit blood-pressure-lowering properties and can be produced for example by reacting compounds of the formula

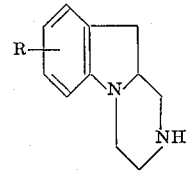

wherein R has the above-indicated value, with cyanamide.

7 Claims, No Drawings

1,2,3,4,10,10A-HEXAHYDROPYRAZINO[1,2:A]INDOLE-2-CARBOXAMIDINES

BACKGROUND OF THE INVENTION

This invention relates to novel carboxamidines and processes for their production.

SUMMARY OF THE INVENTION

The compounds of this invention are 1,2,3,4,10,10a-hexahydropyrazino[1,2:a]indole-2-carboxamidines of Formula I:

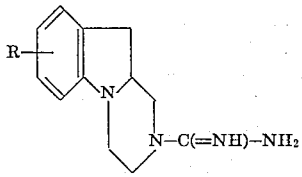

wherein R is H or $CH_3O$, and the physiologically acceptable acid addition salts thereof. This invention also relates to processes for the preparation of compounds of Formula I as well as compositions containing the same.

DETAILED DISCUSSION

The compounds of this invention possess useful pharmacological activity, including blood-pressure-lowering activity. For example, compounds of Formula I (wherein R is hydrogen) have blood-pressure-reducing effects on conscious, nephrogenously hypertonic dogs according to a long-term experiment conducted with dosages starting with 1 mg./kg. per os, with the blood-reducing effect found to be dependent upon the particular dosage administered. Where malignant hypertonia exists in dogs (blood pressure, systolic 240 mm. Hg or higher, diastolic 150 mm. or higher), higher doses of the novel compounds of this invention have been found to have a life-saving effect on the animals. The compounds of Formula I and the physiologically acceptable acid addition salts thereof, can thus be employed as drugs and also as intermediates for the preparation of other drugs.

The present invention also relates to a process for the preparation of compounds of Formula I comprising:

I. The reaction of a 1,2,3,4,10,10a-hexahydropyrazino[1,2:a]indole of Formula II

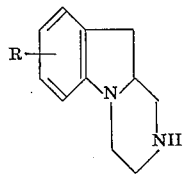

wherein R has the meanings as hereinbefore defined in Formula I, with a compound of Formula III $$NR_1=CR_2—NH_2$$

wherein $R_1$ is H and $R_2$ is alkyloxy, alkylmercapto, 3,5-dialkyl-1-pyrazolyl, or NC—NH—, or $R_1$ and $R_2$ together form a covalent bond, thus forming a C ≡ N group; or II. The catalytic reduction of a tetrahydropyrazino[1,2:a]indole-2-carboxamidine of Formula IV

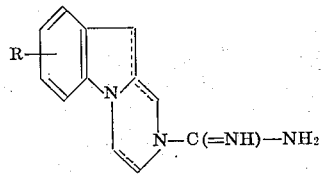

wherein R has the meanings as hereinbefore defined in Formula I, and a single additional double bond is arranged in one of the positions shown by dotted lines, or an acid additions salt thereof.

Compounds prepared by processes I and II can be optionally converted into a physiologically acceptable acid addition salt with the treatment of an acid. Preferred compounds of Formula I include 1,2,3,4,10,10a-hexahydropyrazino-[1,2:a]-indole-2-carboxamidine monohydrochloride, 8-methoxy-1,2,3,4,10,10a-hexahydropyrazino [1,2:a]-indole-2-carboxamidine monohydrochloride, 6-methoxy-1,2,3,4,10,10a-hexahydropyrazino[1,2:a]-indole-2-carboxamidine monohydrochloride, 7-methoxy-1,2,3,4,10,10a-hexahydropyrazino[1,2:a]-indole-2-carboxamidine monohydrochloride and 9-methoxy-1,2,3,4,10,10a-hexahydropyrazino[1,2:a]-indole-2-carboxamidine monohydrochloride.

The Examples of compounds of Formula III include, for example, cyanamide, dicyandiamide, 0-alkyl-isoureas, S-alkylisothioureas, or 3,5-dialkyl-pyrazole-1-carboxamidines, wherein each of said alkyl groups contain from 1-4 carbon atoms, but preferably represent methyl. Especially suitable as reactive derivatives of compounds II and III are the physiologically acceptable acid addition salts thereof, for example their hydrochlorides, sulfates or nitrates.

Compounds of Formula I are produced, for example, by reacting a 1,2,3,4,10,10a-hexahydropyrazino[1,2:a]indole of Formula II, either in the base form or in the form of a physiologically acceptable acid addition salt, e.g., hydrochloride, in admixture with cyanamide at a temperature of between about 100° and 200°C, and preferably between about 110° and 150°C. The reaction can take place in the presence of an inert solvent, including, for example, hydrocarbons, e.g., benzene, toluene; alkanols, e.g., methanol, ethanol, propanol and butanol; high-boiling ethers, e.g., ethylene glycol mono-or dialkyl ethers, e.g., ethylene glycol monoethyl ether; water, or alcohol/water mixtures. Preferred solvents include butanol and ethylene glycol monoethyl ether and a mixture of ethanol and ether. The reactions are generally conducted at temperatures between about 20° C and the boiling temperature of the particular solvent employed, and preferably between about 110° and about 150° C. It is also possible to employ dicyandiamide as a substitute for cyanamide in the reaction, under otherwise identical conditions; whereby cyanamide is produced in situ.

Compounds of Formula I can also be obtained by reacting a compound of Formula II with a physiologically acceptable acid addition salt of an S-alkyl-isothiourea, or of an O-alkyl-isourea. This reaction preferably takes place in the presence of an inert water-miscible solvent, e.g., water, acetone, dioxane, alcohols, etc. In this reaction it is not necessary to maintain a specific reaction temperature although the reaction generally takes place, for example, between 0° C and the boiling point of the solvent employed. Furthermore, compounds of Formula II can be reacted with a physiologically acceptable acid addition salt of 3,5-dialkyl-pyrazole-1-carboxamidine, e.g. 3,5-dimethylpyrazole-1-carboxamidine nitrate, preferably in an inert solvent, e.g., water, alcohols, or other inert water-miscible solvents, or in the absence of said solvents, at temperatures of between about 50° and 150° C, to obtain compounds of Formula I. Generally the reaction is carried out with about 0.2 to 2 and preferably 0.5 to 1.0 moles of a compound of Formula II per mole of a compound of Formula III.

According to another preferred embodiment of this invention, it is also possible to reduce either chemically or catalytically, a tetrahydropyrazino[1,2:a]indole derivative corresponding to Formula IV, preferably a 1,2-,3,4-tetrahydropyrazino[1,2:a]indole-2-carboxamidine or a 1,2,10,10a-tetrahydropyrazino[1,2:a]indole-2-carboxamidine, or a physiologically acceptable acid addition salt of said compounds, to a compound of Formula I and physiologically acceptable acid addition salts thereof.

Chemical reduction can be accomplished, for example, with metals, e.g., tin or zinc or amalgams thereof, in an acidic solution, e.g., acetic acid, but is preferably carried out with diborane in an inert solvent, e.g., hydrocarbons, ethers, cyclic ethers, particularly dioxane, and tetrahydrofuran, at temperatures of between about −70° and +100° C, and preferably between about −40° and +40° C. The metals are employed in an effective amount to bring about the chemical reduction, and are generally present in an amount of between about 30 and 5,000 weight percent of said compounds of Formula IV.

The catalytic reduction takes place, for example, in the presence of catalysts, e.g., platinum, nickel, copper, palladium, salts thereof, e.g., barium sulfate, and mixtures thereof, in the presence of inert solvents, e.g., alcohols, dioxane, ethyl acetate, or acetic acid, hydrochloric acid and mixtures thereof. According to a preferred embodiment, the catalytic reduction takes place in an acetic acid-hydrochloric acid mixture with a palladium-barium sulfate mixture as the catalyst. The temperature range of this process is preferably between about 0° and 100° C and more preferably between about 40° and about 70° C, wherein ambient pressure, as well as elevated pressure (up to about 200 atmospheres) can be utilized. Catalytic amounts of said catalysts are employed according to this embodiment of the invention and generally include between about 1 and 200 weight percent of said compounds of Formula IV.

Since compounds of Formula I have an asymmetrical carbon atom, they can occur either as a racemate or in the form of the two optically active enantiomers. All of these compounds are included within the scope of the above-defined compounds of Formula I. In order to produce one of the optically active forms of compounds encompassed by Formula I, a starting substance (e.g. compounds of Formula II) is suitably employed which already exists in an optically active form and the procedure, as described above, is otherwise followed.

The free base compounds of Formula I obtained according to the invention can be converted into the corresponding physiologically acceptable acid addition salt with the use of an acid. Depending on the amount of acid added, the mono- or di-acid addition salts, e.g., the mono- or dihydrochlorides, can be obtained. Acids which are particularly suitable for this reaction include those acids yielding physiologically acceptable salts. Particularly suitable acids include organic and inorganic acids, e.g., aliphatic, alicyclic, araliphatic, aromatic, heterocyclic mono- or polybasic carboxylic or sulfonic acids. Examples of these acids include alkanoic acids, e.g., formic acid, acetic acid, propionic acid, pivalic acid, diethylacetic acid, malonic acid, succinic acid, pimelic acid, fumaric acid, maleic acid, lactic acid, tartaric acid, malic acid, aminocarboxylic acids, sulfamic acid, benzoic acid, salicylic acid, phenylpropionic acid, citric acid, gluconic acid, ascorbic acid, nicotinic acid, isonicotinic acid, methanesulfonic acid, ethanedisulfonic acid, 2-hydroxyethanesulfonic acid, p-toluenesulfonic acid, naphthalene-mono- and -disulfonic acids, sulfuric acid, nitric acid, hydrohalic acids, e.g., hydrochloric and hydrobromic acid, phosphoric acids, e.g., orthophosphoric acid. Alternatively, the free base compounds of Formula I can be obtained from the acid addition salts thereof by treatment with a base, including for example, alkali metal and alkaline earth metal hydroxides and carbonates, e.g., NaOH, KOH, Ba(OH)$_2$, Na$_2$CO$_3$, or K$_2$CO$_3$, or with a basic ion exchanger, e.g. commercially available types of polystyrene substituted by tertiary amino or by quaternary ammonium groups.

The starting compounds of Formula II have not been described heretofore in the literature. They can be produced from a suitable indoline precursor, or by catalytic or chemical reduction of the corresponding 1,2,3,-4-tetrahydropyrazino[1,2:a]indoles. Suitable indoline precursors include, for example, 2-aminomethylindolines, which can be obtained from 2-aminomethylindoles by reduction with diborane in tetrahydrofuran or acetic acid or by catalytic hydrogenation with palladium/barium sulfate in acetic acid/hydrochloric acid. The subsequent reaction with the diethyl ester of oxalic acid to 1,2,3,4,10,10a-hexahydropyrazino[1,2:a]indole-3,4-diones and subsequent reduction with lithium aluminum hydride results in the formation of compounds of Formula II.

The corresponding alkyl esters containing from one to four carbon atoms, e.g., ethyl, of indoline-2-carboxylic acid are also suitable starting materials for the production of compounds of Formula II. In this procedure, the esters are alkylated, for example, on the nitrogen atom with 2-bromoalkylamine, e.g., 2-bromoethylamine and then cyclized to 1,2,3,4,10,10a-hexahydropyrazino[1,2:a]indole-1-ones. The last stage of the synthesis involves the reduction of a hexahydropyrazino[1,2:a]indole-mono-, di-, or -trione, for example, with a complex metal hydride, e.g., lithium aluminum hydride or diborane, to result in the formation of a compound of Formula II.

1,2,10,10a-Tetrahydropyrazino[1,2:a]indoles can be obtained, for example, by reacting alkyl esters, e.g., ethyl esters, of indoline-2-carboxylic acid with aminoacetaldehyde diethylacetal to 1,2,10,10a-tetrahydro-1-oxopyrazino[1,2:a]indoles and subsequent reducing the reaction products with LiAlH$_4$. A reaction with, for example, cyanamide, results in 1,2,1-0,10a-tetrahydropyrazino[1,2:a]indole-2-carboxamidines. Similarly, 1,2,3,4-tetrahydropyrazino[1,2:a]indole-2-carboxamidines can be produced from 1,2,3,4-tetrahydropyrazino[1,-2:a]indoles.

The compounds of this invention can be employed in admixture with conventional excipients, i.e., pharmaceutically acceptable organic or inorganic carrier substances suitable for parenteral, or enteral application which do not deleteriously react with the active compound. Suitable pharmaceutically acceptable carriers include but are not limited to water, salt solutions, alcohols, vegetable oils, polyethylene glycols, gelatin, lactose, amylose, magnesium stearate, talc, silicic acid, viscous parafin, perfume oil, fatty acid monoglycerides and diglycerides, pentaerythritol fatty acid esters, hydroxy methylcellulose, polyvinyl pyrrolidone, etc. The pharmaceutical preparations can be sterilized and if desired mixed with auxiliary agents, e.g., lubricants, preservatives, stabilizers, wetting agents, emulsifiers, salts for influencing osmotic pressure, buffers, coloring, flavoring and/or aromatic substances and the like which do not deleteriously react with the active compounds.

For parenteral application, particularly suitable are solutions, preferably oily or aqueous solutions, as well as suspensions, emulsions, or implants, including suppositories. Ampoules are convenient unit dosages.

For enteral application, particularly suitable are tablets, dragees or capsules having talc and/or a carbohydrate carrier or binder or the like, the carrier preferably being lactose and/or corn starch and/or potato starch. A syrup, elixir, or the like can be used wherein a sweetened vehicle is employed. Sustained released compositions can be formulated including those wherein the active compound is protected with differentially degradable coatings, e.g., by microencapsulation, multiple coatings, etc.

Generally, the compounds of this invention are dispensed in forms comprising per dosage unit, 1–5,000 mg. of a pharmaceutical carrier and about 1 to 200 mg. of active agent of this invention.

The compounds of this invention are generally administered to animals, preferably but not limited to mammals, including humans. The dose can be administered as a single daily dose or as divided dosages throughout the day. Oral administration is preferred.

The blood-pressure-lowering activity of the compounds of this invention can be demonstrated in laboratory test animals, such as mice, rats or cats.

It will be appreciated that the actual preferred amounts of active compounds used will vary according to the specific compound being utilized, the particular compositions formulated, the mode of application, and the particular patient being treated. Optimal administration rates for a given set of conditions and patients can be ascertained by those skilled in the art by routine experimentation.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, the temperatures are set forth uncorrected in degrees Celsius; unless otherwise indicated, all parts and percentages are by weight.

In the following, a typical preparation of a starting compound of formula II is described.

PREPARATION

A mixture of 100 g. of 1,2,3,4-tetrahydropyrazino-[1,2:a]indole (cf. U.S. Pat. No. 3,317,524), 1,500 ml of acetic acid, 700 ml of 2N hydrochloric acid and 80 g. of 5% palladium-on-barium sulfate catalyst is hydrogenated at 60° under normal pressure until no more hydrogen is absorbed. The mixture is cooled, filtered and evaporated to dryness to yield 1,2,3,4,10,10a-hexahydropyrazino[1,2:a]indole hydrochloride, m.p. 228°.

EXAMPLE 1

22 g. of 1,2,3,4,10,10a-hexahydropyrazino[1,2:a]indole monohydrochloride (m.p. 228°) is refluxed with 22 g. of cyanamide in 100 ml. of ethylene glycol monoethyl ether for 2 hours. After cooling, the solution is diluted with ether. The thus-obtained crystals are filtered and taken up in ethanol. The solution is mixed with activated carbon, filtered, and subsequently diluted with ether. The mixture is allowed to stand, thus obtaining 1,2,3,4,10,10a-hexahydropyrazino[1,2:a]indole-2-carboxamidine monohydrochloride, m.p. 237° (from ethanol/ether).

EXAMPLE 2

6 g. of 8-methoxy-1,2,3,4,10,10a-hexahydropyrazino-[1,2:a]indole monohydrochloride (m.p. 239°) is refluxed with 6 g. of cyanamide in 30 ml. of n-butanol for 3 hours. After cooling, the reaction mixture is diluted with ether, filtered, and the thus-produced 8-methoxy-1,2,3,4,10,10a-hexahydropyrazino[1,2:a]-indole-2-carboxamidine monohydrochloride is recrystallized from ethanol/ether; m.p. 160°.

Analogously, the following compounds are obtained from the monohydrochlorides of 6-, 7-, 9-methoxy-1,2,3,4,10,10a-hexahydropyrazino[1,2:a]indole, respectively:

6-methoxy-1,2,3,4,10,10a-hexahydropyrazino[1,2:a]indole-2-carboxamidine monohydrochloride, 7-methoxy-1,2,3,4,10,10a-hexahydropyrazino[1,2:a]indole-2-carboxamidine monohydrochloride, 9-methoxy-1,2,3,4,10,10a-hexahydropyrazino[1,2:a]indole-2-carboxamidine monohydrochloride.

EXAMPLE 3

10 g. of 1,2,3,4,10,10a-hexahydropyrazino[1,2:a]indole monohydrochloride and 11 g. of cyanamide are mixed and heated to 120° for 20 minutes. After cooling, the reaction mixture is mixed with acetone and filtered. The crystals are taken up in ice-cold sodium bicarbonate solution, and the aqueous phase is extracted with chloroform. The oily base obtained after drying and evaporation of the chloroform phase is dissolved in a small amount of methanol, and the solution is adjusted to pH 5.5 with 1N hydrochloric acid. The mixture is then concentrated by evaporation, the residue is triturated with acetone, and the product thus obtained is 1,2,3,4,10,10a-hexahydropyrazino[1,2:a]indole-2-carboxamidine monohydrochloride, m.p. 236°–237°.

EXAMPLE 4

5.1 g. of oily 1,2,3,4,10,10a-hexahydropyrazino[1,-2:a]-indole in 10 ml. of ethanol is added, at room temperature, to a solution of 4.6 g. of S-methyl-isothiourea sulfate in 10 ml. of water. The reaction mixture is agitated overnight at room temperature and thereafter heated to 60° for 5 hours. The thus-precipitated crystals are filtered, dissolved in a small quantity of water, and mixed with an equimolar solution of barium hydroxide monohydrate. The thus-separated barium sulfate is filtered, and the base is extracted with chloroform. By working the mixture further up as described in Example 3, 1,2,3,4,10,10a-hexahydropyrazino[1,2:a]indole-2-carboxamidine monohydrochloride is obtained.

EXAMPLE 5

4.2 g. of 1,2,3,4-tetrahydropyrazino[1,2:a]indole-2-carboxamidine hydrochloride (m.p. 269°) is dissolved in a mixture of 45 ml. of acetic acid and 10 ml. of 2N hydrochloric acid and hydrogenated at 60° with 3 g. of palladium/barium sulfate under normal pressure. After the absorption of about 500 ml. of hydrogen, the solution is filtered off from the catalyst, and then concentrated by evaporation. The thus-produced oily 1,2,3,4,-10,10a-hexahydropyrazino[1,2:a]indole-2-carboxamidine dihydrochloride is dissolved in a small amount of water and, as set forth in Example 4, converted into the free 1,2,3,4,10,10a-hexahydropyrazino-[1,2:a]indole-2-carboxamidine.

What is claimed is:

1. A 1,2,3,4,10,10a-hexahydropyrazino[1,2:a]indole-2-carboxamidine of the formula

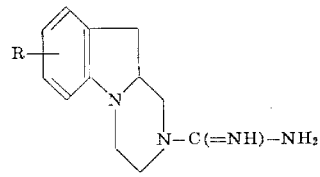

wherein R is H or $CH_3O$, or a physiologically acceptable acid addition salt thereof.

2. A compound of claim 1, 1,2,3,4,10,10a-hexahydropyrazino[1,2:a]indole-2-carboxamidine or a physiologically acceptable acid addition salt thereof.

3. A compound of claim 1 wherein R is $CH_3O$.

4. A compound of claim 3, 8-methoxy-1,2,3,4,10,10a-hexahydropyrazino[1,2:a]indole-2-carboxamidine or a physiologically acceptable acid addition salt thereof.

5. A compound of claim 3, 6-methoxy-1,2,3,4,10,10a-hexahydropyrazino[1,2:a]indole-2-carboxamidine, or a physiologically acceptable acid addition salt thereof.

6. A compound of claim 3, 7-methoxy-1,2,3,4,1-,10a-hexahydropyrazino[1,2:a]indole-2-carboxamidine or a physiologically acceptable acid addition salt thereof.

7. A compound of claim 3, 9-methoxy-1,2,3,4,10,10a-hexahydropyrazino[1,2:a]indole-2-carboxamidine or a physiologically acceptable acid addition salt thereof.

* * * * *